May 5, 1953

R. L. CRAIGLOW 2,637,779

CRYSTAL FILTER CIRCUIT

Filed Nov. 13, 1950

INVENTOR.
ROBERT L. CRAIGLOW
BY Marvin Moody
Atty.

Patented May 5, 1953 2,637,779

UNITED STATES PATENT OFFICE 2,637,779

CRYSTAL FILTER CIRCUIT

Robert L. Craiglow, Cedar Rapids, Iowa, assignor to Collins Radio Company, Cedar Rapids, Iowa, a corporation of Iowa Application November 13, 1950, Serial No. 195,319

3 Claims. (Cl. 178—44)

This invention relates to means for obtaining a constant output from a crystal filter as its band width is changed.

It is well known to those skilled in the art that a piezo electric crystal has a series resonant frequency and a relatively high "Q." It is also known that a crystal has a parallel resonant frequency and that the equivalent circuit of a crystal is a series branch of a condenser, inductance, and resistor with a second condenser connected in parallel across the series branch. The output of a crystal filter is generally taken across a resistance load. At times it is desirable to have a filter which has a variable band width as, for example, a narrow and a broad band width position. The band width may be varied by changing the value of the resistor from which the output is taken. Changing the band width in this manner results in a change in the amplitude of the output.

It is an object of this invention, therefore, to provide a crystal filter circuit whose band width may be adjusted while maintaining the output constant.

A further object of this invention is to provide a reactive load for a crystal filter so that the gain of the filter may be varied.

Yet another object of this invention is to provide a filter circuit which may be switched to broad and narrow band-pass, respectively, while maintaining the output constant.

A feature of this invention is found in the provision for a crystal filter which has its output connected to a reactive load across which an output is removed.

Figure 1:
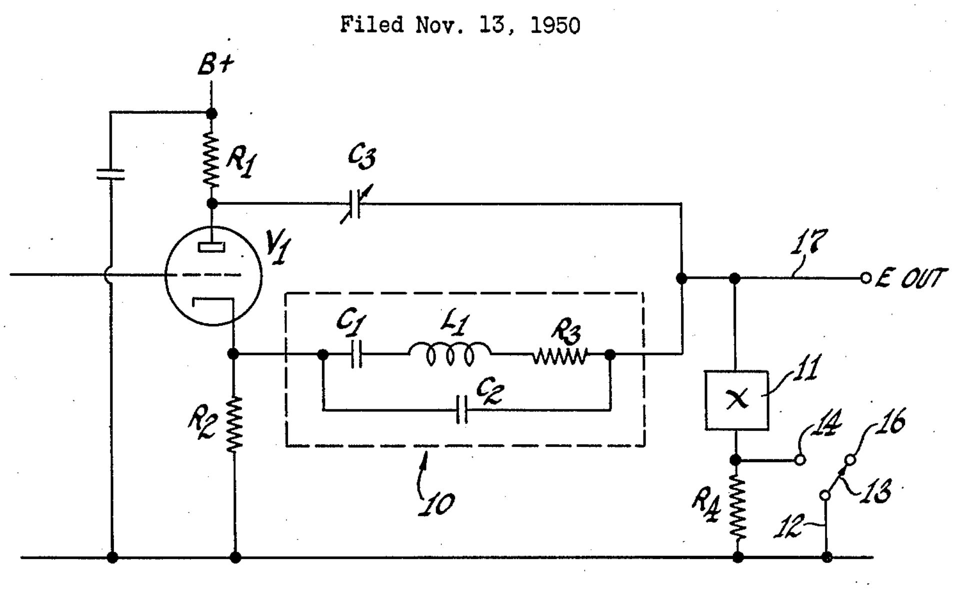
Figure 2:
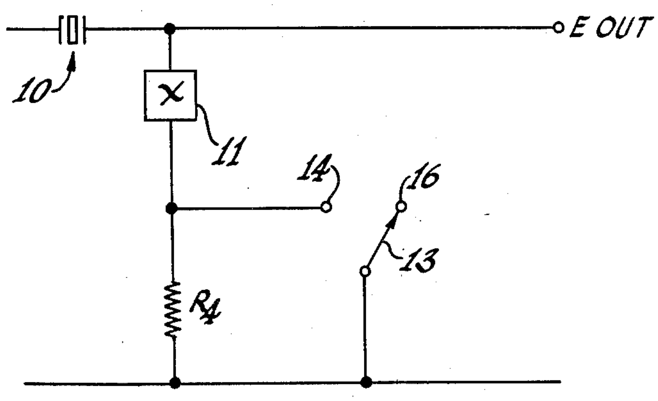

Further objects, features and advantages of this invention will become apparent from the following description and claims when read in view of the drawings, in which:

Figure 1 is a schematic diagram of a crystal filter connected to a reactive load; and Figure 2 is a detailed view of the crystal connected across the reactive load.

Figure 2 shows a crystal, designated generally as 10, which is connected to a reactive component 11. The reactive component 11 is in series with a resistor $R_4$. A switch 13 is connected to one side of the line and is movable between terminals 14 and 16 so as to short out the resistor $R_4$ when in contact with terminal 14. A lead 12 connects the switch 13 with the line.

Figure 1 illustrates the crystal 10 with its equivalent electrical circuit comprising, a series branch of capacitance $C_1$, inductance $L_1$, and resistance $R_3$. A second capacitance $C_2$ is connected in parallel across the other three elements. A phase inverter comprising, an electronic valve $V_1$, a plate resistor $R_1$, and a cathode resistor $R_2$. The crystal 10 receives an input from the cathode of $V_1$. The effect of the shunt condenser $C_2$ is eliminated by balancing it with a variable condenser such as $C_3$ which is connected between the plate of tube $V_1$ and the crystal. The condenser $C_3$ is adjusted until the effect of the shunt of condenser $C_2$ has been eliminated.

An output voltage is removed by the lead 17 which is connected to the upper end of the reactive component 11. When it is desired to operate the filter in the narrow pass-band position the switch 13 is moved to engage terminal 14, thus shorting out resistor $R_4$. The output voltage will then be the voltage appearing across the reactive component 11 and its amplitude is dependent upon the values of the reactive component. The reactive component may be an inductance or a capacitance. The sharpness of the frequency response in this case will depend upon the resistance $R_3$ of the crystal and the maximum current will be limited by its value. If it is desired to broaden the pass band of the filter while maintaining a constant gain the switch 13 may be moved to engage terminal 16, thus resulting in the output voltage being taken across the reactive component 11 and the resistor $R_4$ connected in series. If the value of X is chosen correctly the output voltage need not change in amplitude or may, alternatively, be increased or decreased as desired.

If the current through the reactive component is designated as I then the output voltage when switch 13 engages contact 14 will be IX or

*Case 1*

$$E\,\text{out}=IX=\frac{E\,\text{in}\,X}{R_3} \quad (1)$$

In the case when switch 13 engages contact 16, the output voltage will be:

*Case 2*

$$E\,\text{out}=I\sqrt{(X^2+R_4^2)}=\frac{E\,\text{in}}{R_3+R_4}\sqrt{X^2+R_4^2} \quad (2)$$

If it is desired to have the output voltage equal in both cases, Equations 1 and 2 may be equated and solved for X.

$$\frac{E\,\text{in}}{R_3}X=\frac{E\,\text{in}}{R_3+R_4}\sqrt{X^2+R_4^2} \quad (3)$$

or $$\frac{X}{R_3}=\frac{\sqrt{X^2+R_4^2}}{R_3+R_4} \quad (4)$$

or $$(5)\qquad X=\sqrt{\frac{R_3^2R_4^2}{(R_3+R_4)^2-R_3^2}}$$

It is to be understood, of course, that if it is desired to have the output voltage change between the two conditions, a new value of X may be obtained by equating Equations 1 and 2 with the factor of proportionality contained therein. For example, if it is desired to have E out in Case 2 equal to one half of E out in Case 1, then Equation 1 should be equated to Equation 2 with a factor of 2 placed in front of the Equation 2.

For example, if it is desired to have the output in Case 1 equal to K times the output in Case 2, the following equation may be written:

$$(6)\qquad \frac{X}{R_3}=K\sqrt{\frac{X^2+R_4^2}{R_3+R_4}}$$

which may be solved for X to obtain $$(7)\qquad X=\sqrt{\frac{K^2R_3^2R_4^2}{(R_3+R_4)^2-K^2R_3^2}}$$

Examples of component values are:

$R_1$—300 ohms
$R_2$—300 ohms
$C_3$—5 micromicrofarads

For a 455 kilocycle crystal:

$C_1$—0.0132 micromicrofarad
$C_2$—5 micromicrofarads
$L_1$—9.26 henries
$R_3$—3359 ohms
Q of crystal—7881

The output in the sharp position has 100 cycles pass band between 6 db points.

If in the broad band position it is desirable to have a pass band of 1000 cycles between 6 db points, then the Q of the circuit will be 788.1 and $R_4$ will be 30,231 ohms.

The reactance of X will be 3,038 ohms if it is desired to obtain equal output at both broad and sharp positions.

A capacitance of 115.1 micromicrofarads will give an impedance of 3,038 ohms and may be used as the reactive component 11.

*Case 1*

$$Q_{\text{sharp}}=\frac{2\pi fL_1}{R_3}$$

and

*Case 2*

$$Q_{\text{broad}}=\frac{2\pi fL_1}{R_3+R_4}$$

Another application for the invention is to obtain a variable gain with a constant band pass. This may be accomplished by varying the impedance of X. This causes the output voltage to vary.

It is seen that this invention provides means for obtaining constant gain from a filter in the broad and sharp selective positions.

Although this invention has been described with respect to a preferred embodiment thereof it is not to be so limited as changes and modifications may be made therein which are within the full intended scope of the invention as defined by the appended claims.

I claim:

1. Means for obtaining constant output from a crystal filter in two band-width positions comprising, a load having reactive means and a resistor connected in series and receiving the filter output, switching means for connecting said resistor in and out of the circuit, and the reactive component having an impedance equal in magnitude to:

$$X=\sqrt{\frac{R_3^2R_4^2}{(R_3+R_4)^2-R_3^2}}$$

where $R_4$ is equal to the resistance of said resistor and $R_3$ is equal to the series resistance of the crytal.

2. Means for obtaining an output from a crystal filter which has a predetermined relationship in the sharp and broad positions comprising, a reactive load receiving the output of said crystal filter, a first resistor connected in series with said reactive load, switching means for shorting out said first resistor in the sharp position, an output voltage removed from across the reactive component and said switching means, and the impedance of said reactive load equal to:

$$X=\sqrt{\frac{K^2R_3^2R_4^2}{(R_3+R_4)^2-K^2R_3^2}}$$

where $R_3$ is equal to the series resistance of the crystal, $R_4$ is equal to the resistance of the first resistor, and K is equal to the ratio of the output voltage in the sharp position to the output voltage in the broad position.

3. Means for obtaining a predetermined relationship in the output of a crystal filter in the broad and sharp band-pass positions comprising, a crystal which has a series resistance $R_3$, a reactive component receiving the output of said crystal and having an impedance equal to X, a resistor connected in series with said reactive component and having a resistance equal to $R_4$, switching means for shorting out said resistor in the sharp band-pass position, and the impedance of said reactive component equal to:

$$X=\sqrt{\frac{K^2R_3^2R_4^2}{(R_3+R_4)^2-K^2R_3^2}}$$

where K is equal to the ratio of the output voltage in the sharp position to the output voltage in the broad position.

ROBERT L. CRAIGLOW.

References Cited in the file of this patent

UNITED STATES PATENTS

| Number | Name | Date |
|---|---|---|
| 2,222,043 | Oram | Nov. 19, 1940 |